United States Patent Office 3,324,455
Patented June 6, 1967

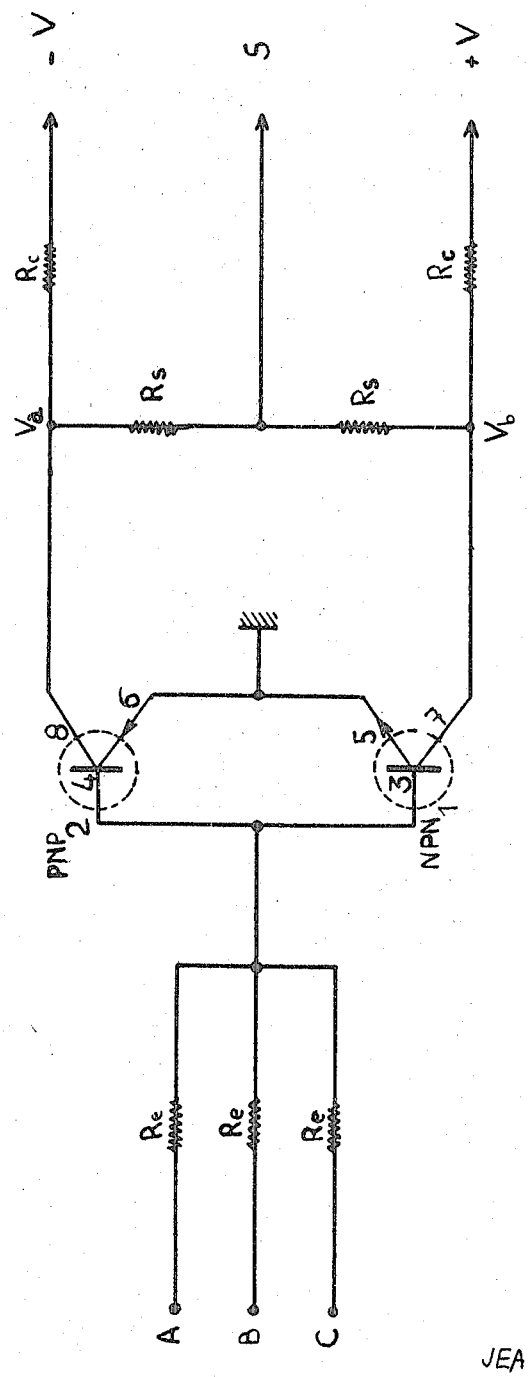

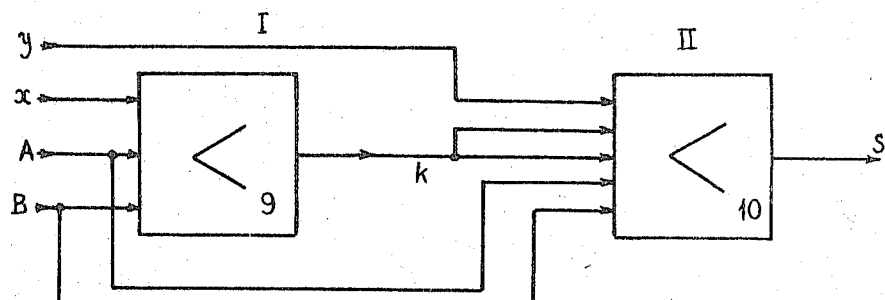
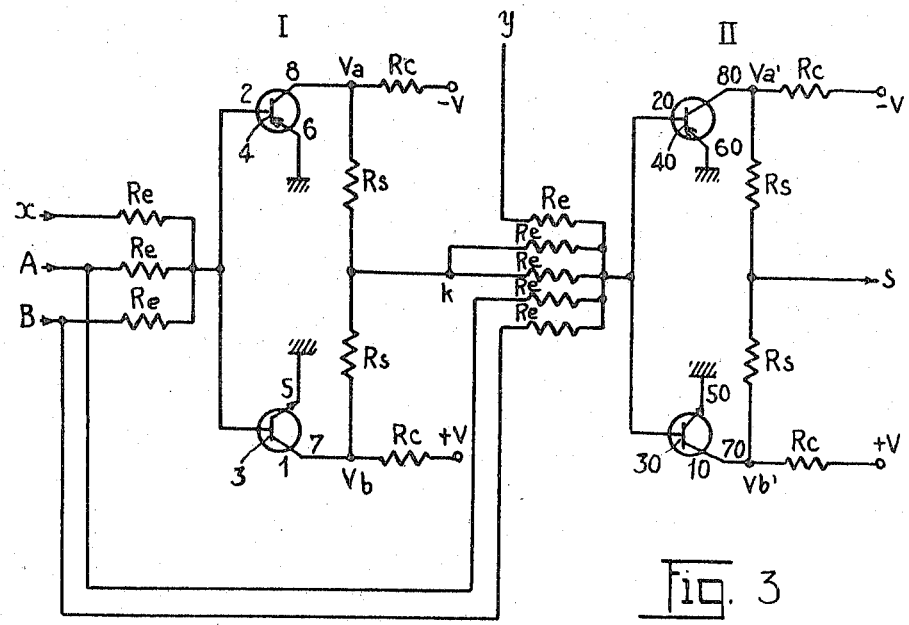

3,324,455
MINORITY LOGICAL OPERATOR
Jean-Jacques G. Mayer, Paris, France, assignor to Société Nouvelle d'Electronique & de la Radio-Industrie, a corporation of France
Filed Oct. 15, 1962, Ser. No. 230,502
Claims priority, application France, Oct. 20, 1961, 876,598, Patent 1,310,717
9 Claims. (Cl. 340—146.2)

The present invention relates to improvements in logic or gating circuits and concerns more particularly a minority logical operator. The term "logical operator" is used herein to refer to an electronic device for performing one or more logic operations.

Such an operator, having one output and several inputs is aimed to provide for the indication of the signals which are applied in minority to its inputs. An advantage of such an operator or gating circuit is that it may replace a relatively large number of conventional logic circuits whatever be the initial grouping of these circuits and the expected results. Even when intricate, logic assemblies using the gating circuits of the present invention are less bulky and consequently be less expensive than assemblies using conventional logic circuitry.

Such a logic circuit or operator is fed at its inputs with signals, for instance voltages, which represent the logical values "0" and "1." Under these conditions, the operator will indicate, for a given distribution of "0" and "1" states at its inputs the state which is in minority.

An essential feature of the operator according to the invention is that it has a single output for an odd-number of inputs.

According to another feature of the invention, the inputs of the operator are connected to two semi-conducting devices, which function such that the sign of the output signal indicates the input signals which are in minority.

According to another feature of the invention, the signals representing the logical values "0" and "1" are currents of opposite polarity but of a same magnitude, this magnitude being chosen so that one of these currents will always saturate one of the semi-conductor devices.

Other features and advantages of the invention will become apparent from the following description of two embodiments explained with reference to the appended drawings in which:

FIGURE 1 is a diagram of an operator having three inputs,

FIGURE 2 is a block diagram of circuits involving a three input operator and a five input operator, and FIGURE 3 is an electrical circuit diagram of FIGURE 2.

A minority logical operator or a complementary majority operator will be first considered, which has only three inputs. It will be noted that a minority operator of the kind will only present an odd number of inputs so that there will not be any ambiguity in the establishment of the minority signals at the inputs.

By reference to FIGURE 1, if A, B, C, are the inputs and S the output of the operator, the truth table summarizing its operation is as follows:

| A | B | C | S |
|---|---|---|---|
| 0 | 0 | 0 | 1 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

In the S column, is given the output function indicating which signals at the inputs are in minority.

The Boolean formula of this circuit may be expressed as follows:

$$S = \overline{AB} + \overline{AC} + \overline{BC}$$

If, for instance, the input C of the circuit is fed permanently with the function "1," S becomes:

$$S_1 = \overline{AB} = \overline{A} + \overline{B}$$

The operator becomes a complemented "OR" circuit, or "NOR," this circuit being such that its output delivers "1" if no "1" is applied to the inputs.

If the input C is only fed with the "0" function, S becomes:

$$S_0 = \overline{AB} + \overline{A} + \overline{B} = \overline{A} + \overline{B} = \overline{AB}$$

and the operator becomes a complemented "AND" circuit.

The operator according to the invention, as represented in FIGURE 1, chiefly comprises two transistors 1 and 2 of which one is a NPN (1) and the other a PNP (2). The bases of these transistors, 3 and 4 respectively are connected to the three inputs A, B and C by means of respective resistors Re. The emitters 5 and 6 of both transistors are grounded and the collectors 7 and 8 are connected to respective voltage sources +V and −V through load resistances Rc. The output circuit S of the operator is connected to the collectors 7 and 8 through resistances Rs.

The logical values "0" and "1" applied at the inputs of the operator, are always represented by the passage of a current I in the input circuit, the polarity of this current being in accordance with the value "0" or "1." But the magnitude of this current remains the same in both cases. It may be assumed for instance that "0" is symbolised by a positive current flow and "1" by a negative current flow.

For a three input operator as illustrated in FIGURE 1, the current applied to the bases of the transistors 1 and 2, can be varied between ±I and ±3I. A current +I saturates the NPN transistor 1 while the current −I saturates the PNP transistor 2.

If it is assumed that inputs A and B are fed with "0" and the input C with "1," a resulting current +I goes through the bases of both transistors 1 and 2 respectively, this current +I saturates the transistor 1 (NPN). The voltage at $V_b$ decreases to zero (assuming that the voltage $V_{ce}$ between the collector and the emitter of the transistor may be neglected). The output voltage Vs may be expressed as follows:

$$Vs = -V\frac{Rs+Rc}{Rc+2Rs}$$

If resistance Rs is much greater than resistance Rc, the preceding formula may be simplified and becomes:

$$Vs = -\frac{V}{2}$$

the minus sign (−) indicating that the value which is in minority at the input is "1." A same reasoning applies when the resulting current at the input is −I; in that case the transistor PNP saturates and the output voltage Vs becomes +V/2.

It may be noted, under these conditions, that the output value is never zero and that the operator delivers at its output a signal the sign of which is opposite to that of the input resulting signal. If this sign condition is not fulfilled, this means that one of the transistors is in a saturated condition and the other cut off. But this situation is not likely to occur. It may be furthermore noted that the use of this operator is technologically very simple and consequently not expensive. The tolerances upon the elements are wide since no bias source is necessary to block the saturated transistor. Moreover the operation of the operator is not troubled by the variations in the negative and positive feeding voltage source, even though important. The flow of current being the same in each state, the load remains generally steady.

All these advantages together with the unlimited number of inputs, allow any number of operations of the kind involved in a complex logical assembly to be carried out with a lesser number of logic circuits.

By reference to FIGURE 2, there is shown in a block diagram an assembly of a three input operator and of a five input operator, both operating in accordance with the description of FIGURE 1.

The reference numeral I designates a three input operator 9 alike that of FIGURE 1 and II designates the five input operator 10 which does not differ from operator 9 but by the number of the inputs as shown in FIGURE 3.

The input functions applied to operator 9 are two variables A and B, a parameter $y$ and the output signal of operator I applied to two inputs.

The transfer function of operator II will be such that its output S will deliver a value "1" if the three inputs at least are fed with "0."

The Boolean formula of the assembly may be expressed in terms of the variable functions A and B and the parameters $x$ and $y$ which may take independently the values "0" and "1."

$k$ being the output value of operator I, $$\overline{k}=AB+x(A+B) \qquad (1)$$

The output value of operator II may be expressed as follows:

$$S=k(A+B+y)+ABy$$

or:

$$S=\overline{\overline{k}(A+B+y)} \cdot \overline{ABy}$$
$$=(\overline{k}+\overline{A+B+y})(\overline{A}+\overline{B}+\overline{y}) \qquad (2)$$

If the value of $\overline{k}$ given by Formula 1 is inserted into Formula 2

$$S=[AB+x(A+B)+(A+B+y)](A+B+y)$$

and by developing the formula:

$$S=\overline{AB}x+\overline{AB}\overline{y}+A\overline{B}x+AB\overline{y}+zy(A+B)$$
$$=x(\overline{AB}+A\overline{B})+\overline{y}(AB+\overline{AB})+x\overline{y}(A+B) \qquad (3)$$

This Formula 3 is the general equation of the assembly constituted by the operators I and II.

By choosing the respective possible values of parameters $x$ and $y$ four cases will be considered, the Equation 3 becoming in each such case as follows:

First case:
$$x+y=0 \qquad S=AB+\overline{AB}$$

Second case:
$$x=y=1 \qquad S=\overline{AB}+\overline{AB}$$

Third case:
$$x=0$$
$$y=1 \qquad S\equiv 1$$

Fourth case:
$$x=1$$
$$y=0 \qquad S\equiv 0$$

It results from the above table that, in accordance with the values of the parameters $x$ and $y$, the output S of the assembly delivers the following values:

1—if $A=B$ (first case)
1—if A is different from B (second case)
0—whatever be the values of A and B (third case)
1—whatever be the values of A and B (fourth case)

The above description of an assembly shows that with only two simple operators without the necessity of applying to its inputs the complemented values of the functions it is possible to point out by means of two parameters, the equality and the unequality between two variable functions or also the identity "1" and "0."

It may be noted that a same result with conventional operators would have required many more elements, at least 6.

FIGURE 3 shows the electrical circuit diagram of the assembly of FIGURE 2.

The operator I is similar to the operator of FIGURE 1. It comprises the three inputs respectively reference by $x$, A and B which are connected to the bases 3 and 4 of transistors 1 and 2, the emitters of which are grounded and the collectors are connected, through resistances R$s$ to the output $k$ of the operator I. The operator II is not very different from operator I except that the number of inputs is five. It comprises two transistors, a PNP (20) and a NPN (10), the bases of which are connected to the inputs. Their emitters are grounded and their collectors are connected to the general output S of both the operator II and the assembly through resistances R$s$.

What I claim is:

1. A gating circuit for logic operations, comprising an output terminal; a multiplicity of input terminals of odd number; two complementary transistors each having a base, an emitter and a collector, the bases of both said transistors being connected to said input terminals, said emitters being at a common ground potential; and respective loads of equal value connecting each of said collectors to said output terminal, whereby the application of electrical signals of opposite polarity corresponding to the logic values "0" and "1" selectively to said input terminals delivers a voltage at said output terminal indicating which of said logic values is in the minority at said input terminals.

2. The gating circuit defined in claim 1 wherein one of said transistors is a PNP-type transistor and the other of said transistors is an NPN-type transistor, the bases of said transistors being connected together and connected with each of said input terminals by a respective resistor whereby electric currents of opposite sense and equal magnitude applied to said input terminals energize said circuit to indicate which of the logic values is in the minority at the input terminals.

3. A gating circuit as defined in claim 2 wherein said circuit has three input terminals.

4. A gating circuit as defined in claim 2 wherein said circuit has five input terminals.

5. A logic assembly with two gating circuits for logic operations, said assembly comprising a first gating circuit having three input terminals and a single output terminal, two complementary transistors each having a base, an emitter and a collector, the bases of both said transistors being connected to said input terminals, the emitters of said transistors being at a common ground potential, and respective loads connecting each of said collectors to the output terminal of said first gating circuit; a second gating circuit having five input terminals and a single output terminal constituting the output of the assembly, two complementary transistors each having a base, an emitter and a collector, the bases of both transistors of said second gating circuit being connected to the input terminals of said second circuit, the emitters of said transistors of said second circuit being at a common ground potential, and respective loads connecting each of the collectors of said second gating circuit with the output terminal thereof; and means for applying variable functions and at least one parameter in the form of electric signals representing the logic values "0" and "1" selectively to the input terminals of said first gating circuit, for connecting the output terminal of said first gating circuit with two of the input terminals of said second gating circuit, and for applying said variable functions and a second parameter to the other three input terminals of said second gating circuit whereby the output terminal of said second gating circuit delivers electrical signals representing the logic values "0" and "1" in accordance with the values of said parameters and said variable functions.

6. An assembly as defined in claim 5 wherein the output signal of said second gating circuit corresponds to the total value "1" upon said parameters being "0" and said variable functions being of identical value, thereby indicating equality of said variable functions.

7. An assembly as defined in claim 5 wherein the output signal of said second circuit has a logic value "1" upon both said parameters having a logic value "1" and said variable functions being of different value, thereby indicating inequality of said variable functions.

8. An assembly as defined in claim 5 wherein the output of said second circuit has a logic value equivalent to "0" upon said variable functions having either value "1" and "0," said one of said parameters having a logic value of "0" and the other of said parameters having a logic value of "1."

9. An assembly as defined in claim 5 wherein the output of said second circuit has a logic value equivalent to "1" upon said variable functions having either value "1" or "0," said first parameter having a value of "1" and said second parameter having a value of "0."

References Cited

UNITED STATES PATENTS

| | | | |
|---|---|---|---|
| 3,113,206 | 12/1963 | Harel | 235—176 |
| 3,165,642 | 1/1965 | Noll | 307—88.5 |
| 3,234,401 | 2/1966 | Dinham | 307—88 |

MALCOLM A. MORRISON, *Primary Examiner.*

M. P. HARTMANN, *Assistant Examiner.*